Aug. 24, 1943.  W. C. EDDY  2,327,626
EXHIBITING APPARATUS
Filed May 5, 1939  2 Sheets-Sheet 1
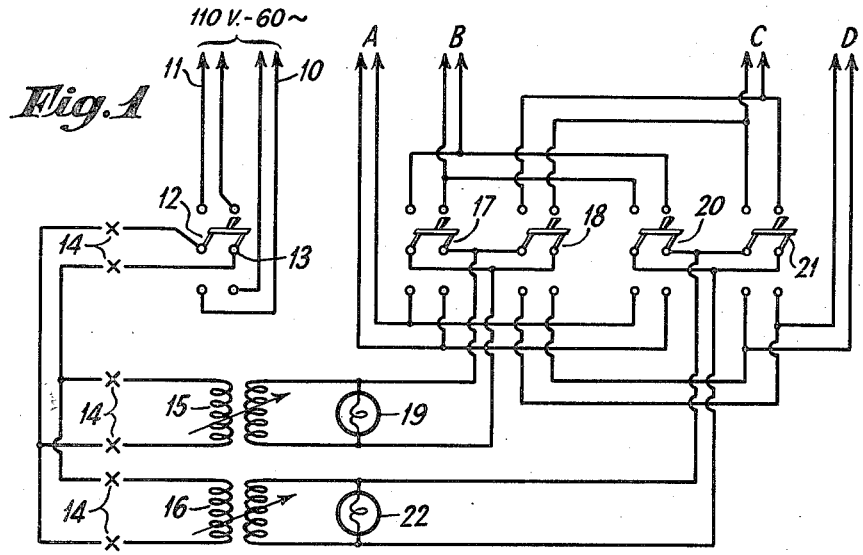
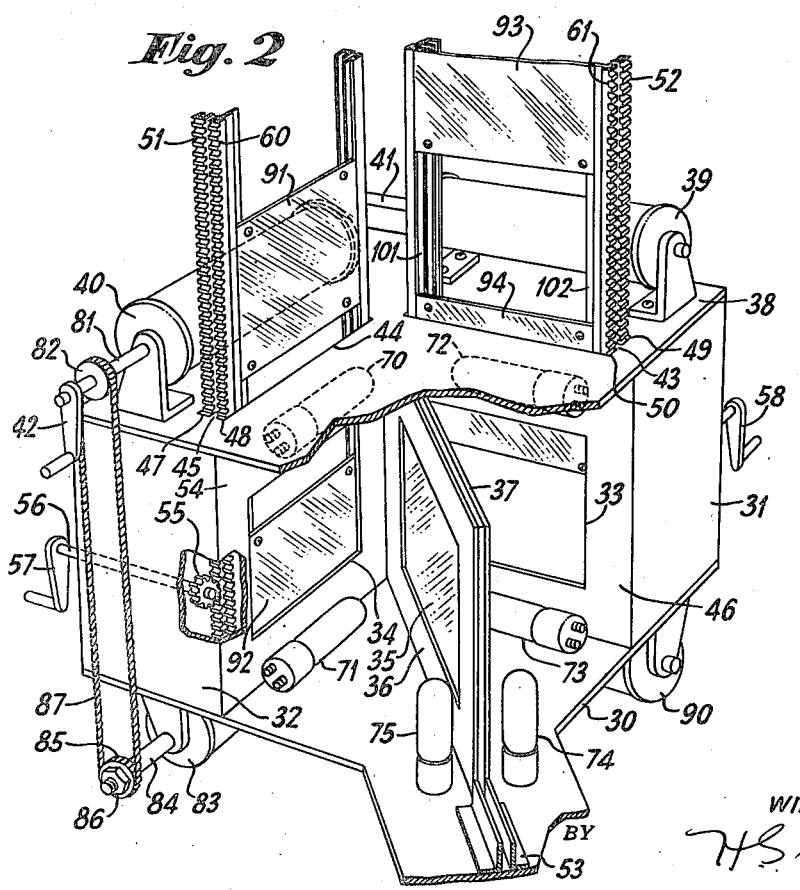
INVENTOR.
WILLIAM C. EDDY
BY
ATTORNEY.

Aug. 24, 1943. W. C. EDDY 2,327,626
EXHIBITING APPARATUS
Filed May 5, 1939 2 Sheets-Sheet 2
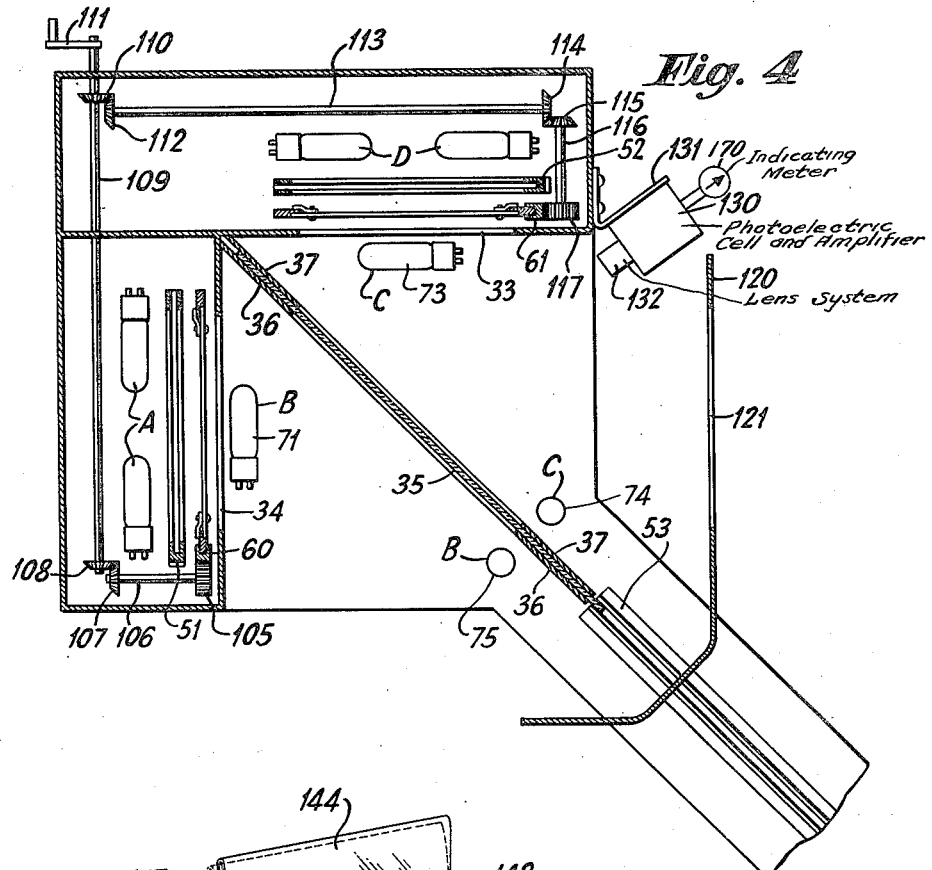
INVENTOR.
WILLIAM C. EDDY
BY
ATTORNEY.

Patented Aug. 24, 1943

2,327,626

UNITED STATES PATENT OFFICE 2,327,626

EXHIBITING APPARATUS

William C. Eddy, Long Island, N. Y., assignor to Radio Corporation of America, a corporation of Delaware Application May 5, 1939, Serial No. 271,985

18 Claims. (Cl. 40—130)

My invention relates in general to optical illusory devices, and more particularly in one of its aspects to such a device for exhibiting and dissolving and/or wiping optical composites, which may for instance be pictures, title material, or the like, for use in the moving picture art, television, and the like.

In the television and moving picture arts, a device or devices for the recording of titles is imperative. Not only must single titles be recorded, but due to the finite area of any frame of an optical image which is usable, it often becomes both necessary and desirable to change from one title to another or to augment a title by other material. The effect on an audience is greatly enhanced if one title or piece of material is caused to gradually be erased while another takes its place. Accordingly, it is one of the objects of my invention to provide a device for bringing into view one optical image and wiping out another existent optical image simultaneously.

Again, it frequently becomes desirable to superpose one optical image on another insofar as a moving picture camera and a television transmitting camera are concerned. In the case of titles, the sources of the titles are usually fixed in position, the titles having been printed or otherwise lettered previous to their recording on moving picture film or transmission from a television camera. Since it is not feasible to place all of the title sources directly in line with the pick-up lens of the camera, some method must be provided for superposing the material contained in some fashion that it may be picked up by the camera lens. Accordingly, it is another of the objects of my invention to provide a device for superposing optical images by reflection and/or projection from one or several sources.

Again, particularly in the moving picture art, it is desirable that titles, figures and the like, may be superposed on a moving background. This material has heretofore been used in the introduction preceding the actual exhibiting of the actual subject-matter of moving picture film, news-reels, and the like. Accordingly, it is another of the objects of my invention to provide a device for the superpositioning of titles, figures and the like onto a moving picture background.

The art of making composite pictures is well established at the present time, and heretofore it has usually been necessary in order to record on a film to mask out a section onto which one component part is to be recorded and another component part may be recorded on the section which is not masked. This is a somewhat difficult and tedious job and, accordingly, it is another of the objects of my invention to provide a device for developing composite optical images in accurate superposition of each component part without the necessity of utilizing the heretofore used masking.

In composite photography hereinbefore referred to, it is also desirable that component sections of a complete image be emphasized or faded out at will. This is particularly useful where such devices are used in conjunction with scientific lectures, educational lectures, and the like. Accordingly, it is another of the objects of my invention to provide a device wherein component sections of a composite image may be emphasized, diminished, or faded out in a desirable fashion.

Also, in the giving of scientific lectures it is usually very desirable to provide drawings of component sections of a complete piece of apparatus, and in some manner bring to the attention of the audience the way in which each component section fits into the complete apparatus. This necessitates the provision of a plurality of individual component images and, accordingly, it is another of the objects of my invention to provide an apparatus for the superposition and/or comparison or contrast of optical images from a plurality of sources.

In the wiping in or wiping out of titles, some means must be provided by which one title might be completely obliterated and the other title rendered definitely visible. Accordingly, it is another of the objects of my invention to provide an apparatus wherein title wiping may be accomplished mechanically and/or optically.

Public interest in scientific accomplishments at the present time has been greatly developed by means of newspaper illustrations, radio lectures, moving picture films, and the like. The advent of television must in some manner provide for the satisfaction of the public interest in many types of program material, and since stage settings and the like are expensive, some means must be provided for furnishing program material at a reasonable cost. Accordingly, it is another of the objects of my invention to provide a device which will provide reasonably priced program material for television.

Also, very interesting material may be provided if animation or a simulation of animation can be accomplished by the machine. As will be explained more fully hereinafter, it is possible with a device of this nature to simulate animation by means of stills, photographs, and the like and, accordingly, it is another of the objects of my invention to provide a device which will give a simulation of animation from a set of still views, photographs, and the like.

The objects of my invention therefore are:

1. To provide a device for wiping in and broadly fading out either simultaneously or instantaneously a set of optical images.

2. Superposition of figures by reflection and/or projection from one or several sources of optical images.

3. To provide reasonably priced program material for television.

4. To provide for the superposition and/or comparison or contrast of optical images from a plurality of sources.

5. To provide a device for the superposition of titles, figures and such on a moving picture background.

6. To provide a device whereby component sections of a complete image may be emphasized or faded at will.

7. To provide for accurate superposition without heretofore used masking as commonly used in composite photography.

8. To provide mechanical and/or optical title wiping.

9. To provide a device wherein a simulation of animation may be accomplished from stills, photographs and the like.

The operation of my apparatus is in general as follows: The optical images, which in some instances may be titles, or such material may be recorded either or both on the front or the back of an ordinarily opaque material which may be rendered translucent under the influence of light. Light sources are provided at the front and the back of this material in order that the material may travel along an optical path either by reflection or projection. The material which ordinarily is planar and on which the recording is made may be referred to as a slide. In general, my apparatus provides two of these slides at right angles each to the other, and placed along the bisecting angle is a half-silvered mirror which may allow an image both to pass through and to be reflected. One of the slides is provided in the direct line of vision, or in the case of a moving picture camera or a television camera in line with the lens of the camera. Members which are completely optically opaque may be interposed between the half-silvered mirror and each of the slides, and these members may be arranged so that when an opaque member passes before one of the slides, a complementary open section is provided adjacent the other of the slides. Thus by simultaneously moving the opaque members, one of the images may come into the optical axis of the camera while the other is being erased therefrom. It will be appreciated that since two slides are placed at right angles to each other with a half-silvered mirror placed in a 45° angle with respect thereto, a moving picture projector may be placed directly opposite one of the slides, and the material from the projector upon striking the half-silvered mirror will be reflected to one of the slides where it may be seen directly through the half-silvered mirror along the optical axis of the camera. Thus, superposition of title pictures may be made onto a moving background if desired.

The slides, which may be rendered translucent under the influence of light, each have illuminating means interposed between the partially transparent reflecting member and the slide, and also a second illumination means positioned with the slide between the partially transparent reflecting member and the illumination means. This means that by properly controlling the degree and intensity of illumination with the image which is recorded on the face of the slide remote from the partially transparent reflecting member may be projected onto the reflecting member by means of the illuminating means to the rear thereof, and the material on the side of the slide adjacent the partially reflecting transparent member may be reflected onto the reflecting member. Thus, if both of the illuminating means are working, the views will be superimposed one on the other, and a control of the illumination may bring one to the foreground and dissolve out the other, and vice versa. Thus, dissolves may be accomplished as will be explained more fully hereinafter.

My invention will best be understood by reference to the drawings, in which

Fig. 1 is a schematic view of the power supply in operation for the illumination means.

Fig. 2 is a perspective view of the apparatus partially broken away to show some details.

Fig. 3 is a cross-sectional view of a portion of a wipe member.

Fig. 4 is a schematic view taken on a cutting plane parallel to the base of the apparatus.

Fig. 5 is a view of a perspective of a roll type recording adapter.

Fig. 6 is a view of a slide containing optical material recorded on both sides thereof.

Referring to Fig. 1, there is shown a schematic diagram of the power supply and switching arrangement for controlling the illumination within the apparatus. For purposes of simplicity, it is assumed that four groups of illuminating means are used and have been identified as groups A, B, C and D respectively.

Reference should be had to Fig. 4 for an exemplary arrangement of the illuminating means per se, and the illustration herein contained shows the lead wires leading to these groups of illuminating means. For purposes of simplicity, these leads have been omitted from Figs. 2 and 4.

In the drawings, two sources of power supply 10 and 11 respectively are shown as connected to a double-pole double-throw switch 12. The terminals 13 of the switch member 12 are connected through circuit breakers 14 to the primaries of two variable transformers 15 and 16 respectively.

In view of the fact that four sources of illumination are illustrated and at least four sources are normally required, it would be feasible to control these sources of illumination directly each from a separate variable transformer. However, for purposes of simplicity, two variable transformers are illustrated herein since this arrangement gives a more simplified control from a studio standpoint, and it should be borne in mind that this apparatus is particularly adaptable for the use in television where quick and complicated changes of sources of illumination are required to properly display the material. Hence, the arrangement shown is advantageous.

The secondary winding of the variable transformer 15 is connected to two double-pole double-throw switch members 17 and 18. Connected directly across the line leading to these switches is an indicating means 19, by means of which the operator may judge the power supplied to the illuminating means. This might, for instance, be a meter, a light, or other indicating means. One pair of terminals of the switch 17 is connected directly to the sources of illumination identified as A. The other pair of terminals of the switch member 17 is connected directly to the sources of illumination identified as B.

The secondary winding of the variable transformer 16 is connected directly to two double-pole double-throw switch members 20 and 21 respectively. Also shunted across the line leading to the switch is an indicating means 22 which may be similar to the indicating means 19 hereinbefore referred to. One pair of the terminals of the switch member 20 is connected to the source of illumination A, and the other pair of terminals is connected directly to the source of illumination B. Hence, one pair of poles of the switch 17 is connected in parallel with one pair of poles of the switch 20, and similarly one pair of poles of the switch 21 is connected directly to the illuminating means C as illustrated, and the other pair of poles thereof is connected directly to the illuminating means D, thus placing the poles in parallel. As illustrated, one pair of poles of the switch member 21 is in parallel with one pair of poles of the switch member 18, and the other pair of poles thereof is in parallel with the other pair of poles of the switch member 18. Hence, it will be appreciated that every one of the four sets of illuminating means illustrated may be energized by either of the two variable transformers. The two sources of power which are connected to the switch member 12 are illustrated instead of one source of power in view of the fact that in case of power failure, a separate source of power is highly desirable.

Referring to Fig. 2, there is shown a perspective view of the apparatus partially broken away in one section thereof for purposes of clarity.

The specific form of the apparatus illustrated herein is in general comprised of a base member 30 on which are placed two box-like members 31 and 32 positioned normally to each other. The box-like member 31 contains a rectangular aperture 33, and the second box-like member 32 contains a similar rectangularly shaped aperture 34. Positioned at an angle of substantially 45° with respect to the faces containing the apertures 33 and 34 respectively is a half-silvered mirror 35 which is illustrated as being set in a guide member 53, the latter having been partially broken away for purposes of simplicity, and it will be appreciated that this guide member can be extended to any desired length in order that the mirror my be moved along the guide, while maintaining the same relative angle to each of the faced members containing the apertures 33 and 34. The reason for so doing is to provide means whereby an optical wipe of the views may be accomplished, as will be explained more fully hereinafter. Positioned immediately adjacent to, and masking a portion of, the half-silvered mirror 35 are two masking members 36 and 37 respectively whose function will be explained more fully hereinafter.

The top 38 of the apparatus is in general a rectangular element which has been shown as being cut away for purposes of clarity. Mounted on the top in suitable bearing members are two roll members 39 and 40, which have handles 41 and 42 connected thereto, and the operation and function of these roll members will be explained hereinafter more fully. The top 38 of the apparatus contains two apertures 43 and 44 which, in this embodiment, are shown as rectangularly shaped apertures positioned normally to each other. A small reentrant section 45 is illustrated in conjunction with the aperture 44, and it will be appreciated that the aperture 43 has a similar mean, and hence each aperture is shaped so as to form two guideways, the purpose of which will be explained more fully hereinafter.

It will be noted that the apertures 43 and 44 have been so positioned that a member passing through these apertures toward the bottom of the apparatus will be so positioned that the faces of the box-like members having apertures 33 and 34 will be interposed between the object so passed and the partially transparent reflecting member 35.

It has been stated hereinbefore that the apertures 43 and 44 have small reentrant sections which effectively form each of these apertures into a guideway for two members. In the illustrated embodiment, the aperture 44 is divided into guideways 47 and 48, and the aperture 43 is divided into guideways 49 and 50. Positioned in each of the guideways 47 and 49 is a rack-like holder 51 and 52 respectively, into which display material may be inserted or may be held. The outer edge of the members 51 and 52 are cut so as to form a rack type of gear, and a section of the box-like member 32 having the face 54 is cut away to show the cooperative relationship between the display material holder 51 and the means for elevating or lowering the holder. This means is illustrated herein as being a pinion gear 55 which is joined to an rm 56 which is suitably mounted in bearings supported by the box-like member 32, and connected to the arm is a driving handle 57. Hence, rotation of the handle 57 accomplishes the raising or lowering of the rack 51. Similarly, rack 52 is raised and lowered by a similar type of arrangement illustrated by the handle 58.

It will, of course, be appreciated that the pinion gear and arm, and handle arrangement, are purely illustrative in nature, and that there are a number of mechanical equivalents which may accomplish the same result and still remain within the spirit and scope of my invention. The illustrated embodiment comprises a workable, desirable, and mechanically feasible system of actuating the above-mentioned slides, held in the holders 51 and 52.

Positioned in the guideways 48 and 50 of the apertures 44 and 43 respectively are two further rack-like members 60 and 61, by means of which wiping of the images is accomplished. These rack-like members, similar to the members 51 and 52, have the edge thereof cut in the form of a rack type of gear, as fully illustrated in the drawing. These members may be raised or lowered synchronously, and the actual apparatus for accomplishing this will be more fully illustrated with respect to Fig. 4. It may be said in general that the members 60 and 61 each have alternate opaque or semi-opaque and transparent sections. Hence, it will be seen from the drawing that the members 60 and 61 are positioned between the members 51 and 52 respectively, and the half-silvered mirror 35, and thus the passage of an opaque section of either of these members before either of the apertures 33 or 34 will obliterate a section of the display material which is contained in the rack 51 or 52 respectively, according to the position of the opaque member. It will again be appreciated that the particular construction hereinbefore related comprises a desirable and feasible mechanical form of these elements, and that other equivalents may be substituted without departing from the spirit and scope of my invention.

There are illustrated in this view for purposes of simplicity an almost minimum number of illuminating means by means of which the apparatus can be operated; and Fig. 4, as will be hereinafter shown, sets out in a little greater detail the illuminating arrangement. This, of course, is for purposes of illustration only, and again it will be appreciated that a greater number and different positioning of the illuminating means may accomplish the same result, and in fact in the actual apparatus a differing arrangement of the illuminating means has been used, but the illustration contained herein is described purely for the purposes of its patentable significance, and modifications will readily suggest themselves to those skilled in the art.

In the arrangement as illustrated a lamp, or other source of illumination, 70, is positioned between the face member 54 and the half silvered mirror, and is positioned substantially at the top of the casing. A second lamp member is positioned so as to be interposed between the face member 54 and the half silvered mirror, and is positioned substantially at the bottom of the case. The object of this is to provide an even illumination over the entire face of the image to be reflected from the images appearing in the aperture 34.

Similarly, on the other side of the half silvered mirror there are positioned two lamps 72 and 73, or other appropriate sources of illumination, one of these lamps being positioned substantially at the top of the casing and between the face member 46 and the half silvered mirror, and the other lamp being positioned substantially at the bottom of the casing and between the face member 46 and the half silvered mirror. Again, the object is to provide even illumination over the entire face of the image appearing in aperture 33. Two further lamp members 74 and 75 are positioned at the extremity of the half silvered mirror 35 remote from its inner section with the members containing apertures 33 and 34, one lamp being positioned on either side of the half silvered mirror.

The roll member 40 is supported by suitable bearing members on the top 38 of the apparatus. Extending therefrom is an arm member 81, a sprocket member 82, and positioned on the bottom of the apparatus is a similar roll member 83 which is suitably supported in bearing members and which contains a sleeve member 84, a sprocket member 85, and the locking nut arrangement 86. The sprocket members 82 and 85 are joined by a drive chain 87.

The operation of the apparatus is as follows: To illustrate the operation of these devices, let us consider first the use of display material adaptable in the form of slides. In general, the slide type of material has comprised a planar slide member which is adapted to be rendered translucent under the influence of light. With the use of such a slide, which is rendered translucent under the influence of light, it will be appreciated that an optical image may be recorded on both the planar faces thereof; whereas it is readily feasible also to use a purely opaque slide with an optical image recorded on only one face thereof. The fact should also be appreciated that with a single slide member which is translucent only under the influence of light, the slide is normally opaque, and hence advantage may be taken of this fact that by positioning illuminating means between an observer and the slide, the slide may be maintained opaque with respect to the observer and the image on the side of the slide facing the observer may be reflected to the observer by the influence of the light on the face of the slide. On the other hand, by the placing of a source of illumination positioned so that the slide is between the observer and the illumination source, the material recorded on the planar face of the slide remote from an observer will be seen by the observer by virtue of the projection of the image through the translucent surface of the slide toward the observer. By the use of sources of illumination positioned between an observer and the slide, and also a source of illumination positioned so that the slide is between the observer and the illuminating source, the image on the face of the slide toward an observer will be observed by virtue of the reflection from the face of the slide to the observer and simultaneously the image on the face of the slide remote from the observer will be projected through to the observer due to the rendering of the slide translucent by the illumination means remote from the observer.

Now, if it be assumed that slides of this nature are held both by the members 51 and 52, and that an observer is positioned so as to look along an axis normal to a slide held by the member 51, the result will be as follows: Images impressed on the half-silvered mirror 35 from a slide held by the member 52 will be reflected therefrom along an axis normal to the slide held by the member 51; whereas images on the slide held by the member 51 will follow an axis normal thereto and will pass through the mirror 35 due to its properties of being partially transparent, and hence images from the slides held by both the members 51 and 52 will be seen along the same axis by an observer and effectively will be superimposed. With this in mind, the effect gained from positioning a slide of the nature discussed both in the member 51 and the member 52 will be as follows: At first, the light source 71 may be illuminated and the image side of the slide adjacent the half-silvered mirror will be transmitted to an observer with an intensity proportional to the intensity of the illumination of the light source 71, the reflective properties of the slide and the transmission coefficient of the member illustrated as a half-silvered mirror or its equivalent which, in its general sense, is a partially transparent reflecting member. So far, only one image is visible due to the opacity of the slide. Now, if the lamp 73 is illuminated, an image recorded on the side of the slide held by the member 52 adjacent the partially transparent reflecting member will pass by reflection to the partially transparent reflecting member, and will be reflected by this member along the same axis as the previously discussed image, and hence superpositioning of the two images is accomplished, and with relative intensities governed by the intensity of illumination of each of the sources, the reflective and transmission properties of the slide, and the reflective and transmission properties of the partially transparent reflecting member 35 here illustrated as a half-silvered mirror.

Now, if the illuminating means 70 is gradually illuminated, the slide held by the member 51 is rendered translucent under the influence of this light, and hence an image recorded on the side of the slide remote from the half-silvered mirror will be projected and transmitted to the mirror, where it will pass along an axis coincidental with the image recorded on the front side of the same slide. Again, the intensity of the image will be governed by the intensity of illumination of the source, the transmission properties of the slide, and the transmission properties of the half-silvered mirror. Similarly, an illumination of the member 72 will render translucent the slide held by the member 52, and an image recorded on the face thereof remote from the half-silvered mirror will pass by projection along an axis coincidental with the image recorded on the front side of the slide. Since it has been illustrated that the intensity and visibility of each of the recorded images may be definitely controlled, it will be appreciated that any image may be brought into the composite with any relative intensity desired, and hence optical dissolves as known to those skilled in the art may be accomplished in any desired sequence or at any desired rate. It will be appreciated that the slide members used as illustrations herein are purely for purposes of illustration, and in no sense am I limited to these specific illustrations since other equivalents will fall fairly within the spirit and scope of my invention and may be substituted.

In actual practice, three dimensional exhibits have been used, and their use has been found to be entirely feasible.

So far, there have been considered only slides of finite dimension and, in general, the slides do not exceed in size the apertures 33 and 34. However, there is no reason why a continuous or roll type of slide may not be used, and in actual practice this has been done to a considerable extent, and with this form of device may be said to have become standard practice. Reference should be had to the rolls 40 and 83 and to similar rolls 39 and 90.

The title material may be wound on one of these rolls, and drawn up past the apertures, and in practice has been wound on the roll 83 and drawn upwardly past the aperture 34 and wound onto roll 40. In an instance of this nature, the member 51 is removed from the apparatus, and a special adapter is placed in the place of this member. This adapter will be discussed more in detail hereinafter with reference to Fig. 5. The arrangement as shown may be operated by turning the handle 42. However, the handle drive arrangement is for purposes of illustration only, and in actual practice the arrangement has been somewhat different. In actual practice, the member 84 is a sleeve member which is adapted to frictionally engage the roll 83 which otherwise might rotate freely. The roll 83 may then be placed in such a position that the material to be exhibited is held under the proper tension. When this is done, the member 84 may be forced up against the roll 83 to frictionally engage therewith by means of a locking arrangement here illustrated as a nut 86. In actual practice, a pulley is placed between the locking member 86 and the sprocket member 85, and this pulley may be driven from an electric motor or an equivalent prime mover, whereby the material is fed upwardly in an even fashion, and rolling and unrolling take place synchronously.

The material on which the exhibits are recorded and which forms the roll is in general similar to the slide material, that is to say, that the material while ordinarily opaque becomes translucent under the influence of light in the same manner as the slide material, and hence is the full equivalent of the slide material with the added advantage that long continuities can be displayed in a shorter period of time and could be successfully done by utilization of the other systems of display provided. It should be understood that the rolls 39 and 90 comprise the same sort of an arrangement as rolls 40 and 83, and may be operated in the same manner. In a device of this nature, the dual roll apparatus might be used without reference to slides if found desirable, and this has been done in actual practice.

Up to this point, only the dissolving of various images has been considered. It will be noted that there has been referred to hereinbefore two members 60 and 61 which are interposed between the partially transparent reflecting member 35 and the image holding devices 51 and 52. The arrangement as illustrated in the drawing shows a member 60 having fastened thereon opaque members 91 and 92 which are spaced apart a definite amount, and the space therebetween is transparent. The member 61 is also illustrated and has two opaque members 93 and 94 fastened thereto. It will be appreciated that these members need not be totally opaque. The illustration of the drawing shows the arrangement of the opaque members of one of the members or racks 60 and 61, the latter which will hereinafter be referred to as wiping members, and the arrangement is such that these members are staggered with respect to each other and are complementary in shape. The actual showing is that of an opaque member on the wiping member 60 immediately adjacent the transparent section in the wiping member 61. As has been stated hereinbefore, these members are adapted to operate synchronously, although for some purposes this may not be done. The synchronous operation will be disclosed more in detail hereinafter with reference to Fig. 4, and the opaque members in the wiping members which are adjustable will have the adjusting feature shown more in detail hereinafter with respect to Fig. 3.

With an arrangement of this nature, the operation of the members is as follows: Assuming images are being transmitted along the axis of observation from both of the slide or roll members which exhibit through apertures 33 and 34 respectively. If the aperture 33 is completely uncovered, then the aperture 34 with this arrangement will be completely shut by the opaque member 92 in the position shown in the illustration. This mean that an image will be transmitted through the aperture 33 while none will be transmitted through the aperture 34. On the other hand, when the wiping members are moved, then one of the apertures is gradually uncovered due to the passage of an opaque member therefrom while the complementary opaque member on the other wipe member will be interposed between the image to be transmitted and the partially transparent reflecting member 35. The illustration shows that the opaque members here are rectangular in form and are placed in exactly staggered relationship, that is to say, that there is no overlapping of the opaque members on any cutting plane at right angles to both members. However, again this is purely for purposes of illustration, and a number of departures may be made from this arrangement.

While the wiping members have been illustrated as being purely opaque with no particular optical design thereon, still it should be appreciated that they lend themselves to the display of material in conjunction with other display devices hereinbefore described as, for instance, the slides or the roll type of exhibiting arrangements. In actual practice, use is made of this particular position for displaying illustrative material concerning the text or advertising material contained in the aforementioned roll or slide devices.

In the first place, the shape of the wipe members need not necessarily be rectangular but may be of any desired shape provided the adjacent wipe member is complementary thereto. In actual practice, an arrangement simulating a sine wave has been used as one opaque member, and its complement of the other, and in another arrangement a serrated edged arrangement has been used as one opaque member with its complement located immediately adjacent on the other wiping rack.

Again, the members 91, 92, 93 and 94, while illustrated here as not overlapping in position, may be adjusted so as to be overlapping to provide a line type of wipe.

Referring to Fig. 3, there is shown a cross-sectional view of one of the wipes as, for instance, wipe 94, and the view is taken on a cutting plane normal to the rack supporting the wipe member. The wipe in general has composed an opaque member identified here as 94, which is joined to two members 101 and 102, the latter members being fastened in position on the section of the wipe bearing the rack type of gear. Also connected to the wipe, comprising the opaque member 94, are the adjusting clamps 103 and 104 which hold the member in place and simultaneously permit of adjustment of the opaque member 94 relatively to the rack. This, of course, is highly desirable for providing the so-called line type of wipe wherein rather than having the opaque members so positioned as to have no adjacent overlapping sections, a small overlapping section may be provided or the negative thereof. Again, this arrangement of the wiping opaque members allows a high degree of flexibility in the positioning and handling of the wipes themselves. For instance, when operating the wipes in one direction, for instance downwardly, it may be desired to have a definite sequence of wiping and disclosing insofar as the optical views themselves are concerned. Now, if it be desired to change this sequence, the position of the wipes relatively to each other may be so changed as to change the entire wiping sequence. For instance, if the view which is normal to the obervation direction is wiped, and the side view which is disclosed through the aperture 33 is disclosed, it may be desired to change the sequence of wiping so that the view through the aperture 33 may be obliterated and the view from the aperture normal to the line of observation may be disclosed. This allows a wide latitude of choice on the part of the operator to meet desirable exigencies of production.

There has been discussed to this point only the wipe using purely the wiping racks. It will be appreciated that wipes according to this invention may be made in other manners. In the first place, there is illustrated a guide member 36 in Figs. 2 and 4 into which is placed the partially transparent reflecting member 35. The line of observation is usually normal to the slide member exhibited through aperture 34. Now, if the partially transparent reflecting member be moved along the guide member 36, which is illustrated here for only a short distance for purposes of simplicity, then the image from the slide members which is normally transmitted through the aperture 33, being reflected into the axis of observation by means of the member 35, will gradually be wiped as the member 35 is withdrawn from the axis of transmission of this view.

It should be understood from the above description that when obliteration of the pictures has been accomplished by means of the wipes hereinbefore referred to, this particular position is then accessible for changing the display material contained therein, without such operation being visible on the axis of observation. Such a procedure permits of continued exhibition of material approximating and simulating animation. Thus animation or a simulation of animation may be accomplished from a set of still views or photographs or exhibits by either the use of the dissolves or wipes taken separately or in conjunction with each other. This, of course, is highly important in the provision of reasonably priced program material which is especially adaptable for use in television programs although it is to be understood that I do not limit myself thereto since such arrangements are highly useful in other arts such, for instance, as the moving picture art. This allows simulated animation by means of material already created such as drawings, pictures and the like, without the necessity of providing the intermediate step usually necessary of photographing, developing and printing each separate exhibit, and combining this material as a composite on a film. Again, this arrangement has the definite advantage that in the production of a composite image, for instance, for the use of moving pictures, it is not necessary to mask out a portion of the film as has been done hereinbefore, but each composite section of the image may be transmitted in its proper position so as to form a composite without the necessity of masking.

Again, this arrangment has a definite application to the animation and formation of titles and the like for home moving pictures in a manner which is both desirable and feasible, and which obviates the necessity for stop-frame animation and the skill required for a special camera, and the skill required in the operation thereof.

Again, wiping may be accomplished optically, and an arrangement for projecting a beam of light along one of the planar faces of the member 35 is illustrated more in detail hereinafter in Fig. 4. If such a beam floods one of the planar faces of the mirror, then the mirror looses its transparent aspect and acts purely as a reflecting member, thus effectively acting as a dissolve.

To this point, the explanation of the machine has been such as to show a self-contained unit. Now, of course, it may also be desirable to introduce pure animation into the material which is observed either by an observer, a recording unit, or a television camera, or the like. For this purpose, the device is provided with an open side as will be shown perhaps more clearly with reference to Fig. 4. A movie projector or the like may be positioned so that its axis of projection is normal to the face 46 of the machine. When a view from such a projector impinges onto the apparatus, the following actions take place: Due to the partially reflecting properties of the member 35, the view is reflected onto the face of the slide or wipe member to the rear of the aperture 34, or a specially prepared mat surface positioned therein. It will be appreciated that while a specially prepared mat surface is the more desirable material to use, nevertheless either a slide or the face of the wipe may be used, although perhaps not to the same efficient degree. In actual practice, a slide having a title or such imprinted on the face thereof adjacent the transparent reflecting member 35 has been treated with a light reflectng paint, the latter forming a desirable mat type of surface. In actual practice, the title or like material has not been recorded on the slide with black or other highly contrasting colors but has been recorded on the slide by light colored materials such as white ink, aluminum powder, talcum powder, glue, or the like, or similar non-contrasting inks familiar to those skilled in the art. The result then is that this material is practically invisible by the observer and forms an excellent reflecting surface for transmitting animation. Nevertheless, the material itself will be opaque to light transmitted from the rear of the slide and, accordingly, by bringing up the intensity of illumination on the lights such as illustrated at 70, the title may be gradually brought in to view.

On the other hand, a second image also would be formed from the projected image due to the fact that the member 35 is not only partially reflecting but is partially transparent. This means that under normal circumstances the view would pass through the transparent partially reflecting member 35 and, if a reflecting surface were positioned in the aperture 33, then the image formed thereon would be reflected again to the side of the mirror adjacent the observer, and this image would interfere with the image seen on the mat surface in the aperture 34, which not only is out of phase, but a certain amount of parallax is involved due to the finite thickness of the partially transparent reflecting member 35. To prevent this, I have in actual practice masked the aperture 33 with a material which is light absorbent and non-reflective, such as velvet or the like. Hence, it is possible to combine animated programs from a moving picture projector with either still titles, wiped titles, rolled titles, or simulated animation, in any or all of the compartments. It will be understood that it would be just as feasible to use the light absorbent masking material over the aperture 34 rather than the aperture 33, and reflect the image back to the partially transparent member 35 where it would travel along an axis coincident with the line of observation. The system immediately hereinbefore described comprises so-called "front" view projection, but it is also feasible to use rear view projction and to project from the side or the back of the device onto the planar surface of a screen member interposed in either the aperture 33 or 34 on the face thereof remote from the partially transparent reflecting member 35. It will be appreciated that the commutations and permutations of the effects hereinbefore described will be only dependent on the character of the exhibition required, and further description of the possible combinations are not thought to be neecssary but will readily suggest themselves to a person skilled in the art to which this apparatus belongs.

Referring to Fig. 4, there is shown a schematic view of the apparatus as seen on a cutting plane parallel to the bottom of the apparatus, and this view is shown for the purpose of more clearly illustrating the positioning of the lines, the operation of the wipes, and the like. The positioning of the half-silvered mirror 35 is shown relatively to a guide channel 53 by means of which the so-called mirror wipe may be accomplished. This wipe has been explained hereinbefore. Adjacent the mirror are the masking sections 36 and 37 which have also been explained hereinbefore.

The synchronous action of the wipes may be accomplished in the following manner according to this drawing. It will be understood, of course, that this merely illustrates one embodiment of a method of, and apparatus, for synchronously performing the wiping operation and a number of modifications will suggest themselves to persons skilled in the art to which this apparatus belongs and which fall fairly within the spirit and scope of my invention as defined in the hereinafter appended claims.

It will be noted that the wipe rack 60 meshes with a pinion gear 105, which is joined to an arm 106, and on the end of the arm remote from the pinion gear is a beveled gear 107, this latter in turn meshing with a bevel gear 108 which is connected to a drive shaft 109 which in turn is equipped near the end remote from the gear 108 with a second bevel gear 110 and continues thence to a driving handle 111. Thus, turning of the handle 111 will raise or lower the member 60 in accordance with the direction in which the handle is turned.

Meshing with the bevel gear 110 is a bevel gear 112 joined to an arm member 113, and at the end of the arm member remote from the gear 112 is a second bevel gear 114 which in turn meshes with a bevel gear 115 connected to arm 116, the latter arm having a pinion gear 117 connected at the end thereof remote from the gear 115. This pinion meshes with the rack on the side of the wipe member 61, and hence it will be seen that the wipe 61 raises or lowers similarly to and synchronously with the wipe member 60. The relative positioning of the slide holding members 51 and 52 relatively to the apertures 34 and 33 is also fully brought out.

There is also brought out in this view a member which is not disclosed in Fig. 2, it having been omitted therefrom for purposes of clarity and simplicity. This is the member 120 having a viewing aperture 121 contained therein, and it is through this aperture that views from the apparatus are observed in practice. This member bends around toward the open side of the apparatus and in actual practice acts as a reflector for the lights 74 and 75 of this figure. Of course, it will be appreciated that further light members may be connected within the angular section of the member 120 and by properly reflecting the light given off by these members, the planar surface of the partially transparent reflecting member may be flooded with a beam of light to accomplish an optical dissolve or wipe hereinbefore referred to, depending upon the section of the partially transparent reflecting member which is flooded by the light.

Further, in addition, there is disclosed on this apparatus in this figure a light integrating apparatus 130 which is fastened to the framework of the device by an adjustable angle iron 131. This light integrating device consists primarily of a lens 132 which, by reason of its optical characteristics, covers the complete optical image as traced on the transparent mirror 35 and projects this image upon the plate or anode of a photoelectric cell within the compartment 130, the latter being so positioned as to record only that portion of the mirror as is visible to the observer viewing the transparent mirror along the axis normal to the face of the apparatus having the aperture 34. The determination of the area of the mirror covered by the photoelectric cell depends on the proximity of the cell to the lens system 132. It will be understood that this photoelectric cell may be connected through an amplifier or series of amplifiers furnishing a source of power to a visual indicator 170, such as a milliammeter which may be calibrated in terms of optical units. Of course, it will be appreciated that any visual indicator could be so calibrated as to respond to a definite and desirable set of conditions, and thus in no way am I limited to the use of a milliammeter as a visual recorder.

Referring to Fig. 5, there is shown a perspective view of a roll title adapter for use in the apparatus. It has been explained hereinbefore that this adapter may take the place in position of the title slide 51 or 52 as desired, or both. The adapter consists in general of a framework 140 having a rack gear 141 on one or both of the sides thereof so that it will be interchangeable with the members 51 or 52, and may be driven by the driving pinion illustrated at 55. The edge of the face of the frame opposite the face on which the rack 141 is mounted is channeled so as to accommodate spring strip members 142 and 143 which fit therein. These members are bent upwardly slightly at the extremities thereof.

Also positioned in the channel of the members 140 and 141 and at either end thereof are members 144 and 145. These members each comprise a sheet of phosphor bronze of approximately 10 mils thickness or of such thickness to allow a high degree of flexibility.

The operation of this device is as follows: The title roll sheet may be either fed upwardly with respect to this adapter or downwardly as desired, although of course the preferred form of traversal is such that the roll feed from the bottom to the top since this is the manner in which the eye is accustomed to read and interpret material. The sheet passes between the spring strips 142 and 143 and the fact of the member 145, and passes upwardly and emerges from the spring strips 142 and 143 across the face of the member 144 where it is fed to the roll member 40. It will be appreciated that since the members 144 and 145 have a high degree of flexibility, and further since the roll members 40 and 83 are displaced with respect to the adapter when it is in position, the roll material tends to, and actually does bend the members 144 and 145 as illustrated by the sketched positions of these members at 146 and 147. At the same time, the end of the members 144 and 145 which is held in the channel of the members 140 is pressed outwardly, due to the flexibility of the material so as to engage in closer contact with the spring members 142 and 143. Hence, the roll material is held in a somewhat tense fashion so that irregularities in the plane face thereof, such as wrinkles, are definitely avoided. Also, it adds a slight amount of load to driving rolls. Also, this tensioning of the material forms a load or break on the rolls 40 and 83 so that these rolls do not run very fast but are loaded.

Referring to Fig. 6, there is shown an illustration of a slide member with an optical image recorded on both sides thereof. For the purpose of illustration only, this slide has been bent as this is the only feasible manner of illustrating recording on both sides of a plane member. In practice, the optical image recorded on one side of the member is usually complementary to the optical image formed on the reverse side thereof. In this case there has been illustrated merely a view in which one section 200 of a house might be illustrated on one side of the slide member 201 and the remaining section of the house 202 might be recorded on the opposite side thereof. It should be borne in mind that this is purely for purposes of illustration and does not in any sense limit the manner in which both sides of the plane slide member may be utilized to form a composite or general optical image.

As stated hereinbefore, there are a number of modifications of apparatus and other satisfactory methods of accomplishing the same mechanical results which will occur or suggest themselves to those skilled in the art to which this apparatus belongs, and which fall fairly within the spirit and scope of my invention as defined in the hereinafter appended claims.

What I claim is:

1. An exhibiting device comprising a plurality of sources of optical images at least two of which are positioned in substantially parallel relationship, a partially transparent member positioned at a finite angle with respect to said optical image sources, illuminating means for reflecting one of said substantially parallel images onto said partially transparent member, separate illuminating means for projecting another of said substantially parallel images onto the partially transparent member whereby said projected and reflected images pass from said partially transparent member along the same optical path, a third illuminating means positioned at a finite angle to said first named image sources for projecting another optical image to said partially transparent reflecting member to cause the last named image to merge into substantially the same optical path from said partially reflecting member as the substantially parallel images so as to form a composite image from the plurality of image sources, separate means to energize each of the illuminating means, and control means to vary separately the brilliance of each illuminating means.

2. An exhibiting device comprising a plurality of sources of optical images at least two of which are positioned in substantially parallel relationship, a partially transparent member positioned at a finite angle with respect to said optical image sources, means for reflecting one of said substantially parallel images onto said partially transparent member, means for projecting another of said substantially parallel images onto the partially transparent member whereby said projected and reflected images pass from said partially transparent member along the same optical path, and means for simultaneously reflecting another optical image positioned at a finite angle to said sources of images in parallel relationship to said partially transparent reflecting member whereby said latter reflected image travels along the same optical path from said partially reflecting member as the substantially parallel images to form composite image, separate means to energize each of the illuminating means, and means to vary separately the brilliance of each illuminating means.

3. An exhibiting device comprising a plurality of sources of optical images to be exhibited, a partially transparent reflecting member positioned at a finite angle to the images to be exhibited, a movable opaque member positioned between each of said images and said partially transparent reflecting member, means for transmitting said images to said partially transparent reflecting member whereby the optical axes of the transmitted images are rendered coincident, and means for moving at least one of said opaque members whereby at least one of the images may be gradually obliterated.

4. Apparatus in accordance with claim 3 comprising, in addition, means to move said opaque members simultaneously.

5. Apparatus in accordance with claim 3 comprising, in addition, means to move by equal amounts said opaque members simultaneously.

6. Apparatus in accordance with claim 3 wherein said opaque members are complementary in shape.

7. An exhibiting device comprising a plurality of sources of optical images to be exhibited, and an adjustable partially transparent reflecting member positioned at a finite angle with respect to each of said images whereby at least one of said images passes through said partially transparent reflecting member and at least another of said images is reflected from the reflecting surface of said transparent member along an optical axis substantially coincident with the images passing through said transparent member, the adjustment of said mirror acting to obliterate a portion of one of the images along the coincident axis in proportion to the adjustment of the transparent member.

8. An exhibiting device comprising a plurality of sources of optical images to be exhibited, a partially transparent reflecting member positioned at a finite angle with respect to said sources of images, separate illuminating means positioned relative to each of the plurality of said images and said partially transparent reflecting member whereby the images may be individually reflected onto said transparent means, at least one of said images being passed through said partially transparent means, and at least one other of said images being reflected from the reflecting surface of said partially transparent reflecting member whereby said images assume coincident optical paths, and separate means to control the energization of each illuminating means for varying gradually and separately the intensity of each of said illuminating means whereby the relative optical intensity of each of said images may be simultaneously varied.

9. An exhibiting device comprising a plurality of sources of optical images to be exhibited, a partially transparent reflecting member positioned at a finite angle with respect to said images, a source of illumination positioned relative to at least one of said images and said partially transparent reflecting member whereby the image may be reflected onto said partially reflecting transparent member, a source of illumination positioned so as to have at least one of said images between said source and said partially transparent reflecting member whereby the image may be projected onto said partially transparent reflecting member, at least one of said images passing through the partially transparent member, and at least one other of the images being reflected by said partially transparent reflecting member along an axis substantially coincident with the images passing therethrough, separate means to energize each of the illuminating means, and means for separately controlling the intensity of illumination of each of said sources of illumination whereby the relative optical intensities of each of said images may be simultaneously varied.

10. An exhibiting device comprising at least one planar member adapted to become translucent under the influence of light, said translucent member having an optical image recorded on each of its planar faces, a partially transparent reflecting member positioned at a finite angle with respect to said planar member, illuminating means interposed between said planar member and said partially transparent reflecting member, additional illuminating means so positioned that said planar member is interposed between the said additional illuminating means and the partially transparent reflecting member whereby the optical image on the planar face remote from said partially transparent reflecting member is projected onto the reflecting member, and means for controlling the intensity of illumination of each of the illuminating means whereby the relative optical intensities of each of said images may be varied.

11. An exhibiting device comprising a plurality of planar members adapted to become translucent under the influence of light, said members having an optical image recorded on at least one of the planar faces thereof, a partially transparent reflecting member positioned at a finite angle with respect to said planar members, illuminating means positioned between each of said planar members and said partially transparent reflecting member, additional illuminating means so positioned with respect to each planar member that the planar members are interposed between the additional illuminating means and the partially transparent reflecting member whereby images recorded on the face of the planar member remote from said partially transparent reflecting member may be projected thereon under the influence of light, and means for controlling the intensity of illumination of each of the illuminating means whereby the relative optical intensities of each of said images may be varied.

12. In an exhibiting device wherein optical images are exhibited under the influence of illumination, a light integrator positioned so as to record the total illumination, and indicating means connected to said light integrator for indicating the total illumination in said exhibiting device.

13. In an exhibiting device, a partially transparent planar reflecting member, planar optical image areas positioned on each side of the reflecting member so that the said images are observable as a composite along a common optical axis substantially 45° to the planar reflecting member, means for illuminating said planar optical image areas, a light integrator positioned in the path of observation, and means connected to said light integrator for indicating the total illumination from all of the illuminating sources.

14. In an exhibiting device, a partially transparent planar reflecting member, a plurality of planar optical image areas, means for illuminating said image areas so that said images are transmitted to the partially reflecting member so that the said images are observable as a composite along a common optical axis substantially 45° to the planar partially transparent reflecting member, a light integrator positioned in the path of observation, and means connected to said light integrator for indicating the total illumination in all of the sources of illumination.

15. An exhibiting device comprising at least two planar faced members positioned in planes substantially normal to each other, a recording of an optical image on the planar face of each of said members, a partially transparent reflecting member positioned substantially at an angle of 45° with respect to each of said planar members whereby the image from one of said planar members is transmitted through said partially transparent reflecting member and the image from the other of said planar members is reflected by said partially transparent reflecting member along an axis substantially coincident with the axis of the optical view transmitted directly through said partially transparent reflecting member, and means for simultaneously projecting an additional optical image onto said partially reflecting member along an axis substantially normal to one of said planar members and substantially parallel to the other planar member, whereby said last named projected image is transmitted from said partially transparent reflecting member along an axis coincident with the images from both of said planar members.

16. Apparatus in accordance with claim 15 comprising, in addition, sources of illumination for illuminating the optical image on each of the planar members, and means for controlling the degree of illumination whereby the relative optical intensities of each of said images may be varied.

17. Apparatus in accordance with claim 15 comprising, in addition, a light absorbent mask interposed between the partially transparent reflecting member and the planar member which is positioned normal to the axis of the projected image for preventing image interference.

18. Apparatus in accordance with claim 11 wherein at least one of the planar members adapted to become translucent under the influence of light comprises an elongated sheet of material having a plurality of individual optical exhibits on at least one of the planar faces thereof.

WILLIAM C. EDDY.